US008909053B2

(12) United States Patent
Brassil (10) Patent No.: US 8,909,053 B2
(45) Date of Patent: Dec. 9, 2014

(54) TENANT ISOLATION IN A MULTI-TENANT CLOUD SYSTEM

(75) Inventor: John T. Brassil, Belle Mead, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 443 days.

(21) Appl. No.: 12/822,934

(22) Filed: Jun. 24, 2010

(65) Prior Publication Data

US 2011/0318011 A1    Dec. 29, 2011

(51) Int. Cl.
| | |
|---|---|
| H04J 14/02 | (2006.01) |
| H04B 10/00 | (2013.01) |
| H04J 3/22 | (2006.01) |
| G06F 13/14 | (2006.01) |
| G06F 15/16 | (2006.01) |

(52) U.S. Cl.
CPC ............ *H04J 14/02* (2013.01); *H04J 14/0227* (2013.01); *G06F 13/14* (2013.01); *G06F 15/16* (2013.01)
USPC ................. 398/82; 398/51; 398/140; 398/79; 709/223; 709/250

(58) Field of Classification Search
USPC .................................................. 398/82, 100
See application file for complete search history.

(56) References Cited

U.S. PATENT DOCUMENTS

| | | | | |
|---|---|---|---|---|
| 7,804,840 | B2 * | 9/2010 | Rupanagunta et al. ....... | 370/401 |
| 2002/0198998 | A1 * | 12/2002 | Unice ........................... | 709/227 |
| 2005/0226618 | A1 * | 10/2005 | Lange et al. .................... | 398/79 |
| 2005/0246436 | A1 * | 11/2005 | Day et al. ....................... | 709/223 |
| 2006/0104304 | A1 * | 5/2006 | Nara et al. ..................... | 370/463 |
| 2007/0189673 | A1 * | 8/2007 | Yoshikawa ..................... | 385/53 |
| 2009/0089625 | A1 | 4/2009 | Kannappan et al. | |
| 2009/0241108 | A1 | 9/2009 | Edwards et al. | |
| 2009/0271472 | A1 | 10/2009 | Scheifler et al. | |
| 2010/0030883 | A1 | 2/2010 | Kiefer et al. | |
| 2010/0031253 | A1 | 2/2010 | Adams et al. | |
| 2010/0061383 | A1 | 3/2010 | Rupanagunta et al. | |

OTHER PUBLICATIONS

Cisco [Cisco CWDM Passive Optical System Installation Note].*
Hong, T. et al., "D05.5Design and Concept of a Trusted Virtual Datacenter", Information Technology Society, Nov. 21, 2008.
http://www.cisco.com/en/US/docs/solutions/Enterprise/Data_Center/Virtualization/securecldg.html, "Designing Secure Multi-Tenancy into Virtualized Data Centers", downloaded Jun. 24, 2010.
Swoyer, S.,"VMware, Cisco, NetApp Team Up for Cloud Security", Enterprise Systems, Feb. 3, 2010.
Cisco Systems, Inc., Cisco CWDM Passive Optical System Installation Note, 2004-2005, Cisco Systems, Inc, San Jose, USA.

* cited by examiner

*Primary Examiner* — Oommen Jacob (57) ABSTRACT

Isolating tenants in a multi-tenant cloud system includes identifying a plurality of tenants in the multi-tenant cloud system, assigning a domain to each tenant of the plurality of tenants based on a wavelength division multiplexing (WDM), for each wavelength set of the plurality of wavelength sets, associating each wavelength set with a different domain of the plurality of domains and with a different indicator identifying the domain for the wavelength set, and isolating each tenant using the associated wavelength sets and associated indicators. The plurality of tenants share computational resources in the multi-tenant cloud system and the domain includes the computational resources for each tenant. The WDM uses a plurality of wavelength sets and each wavelength set includes one or more wavelengths.

19 Claims, 5 Drawing Sheets

TENANT ISOLATION IN A MULTI-TENANT CLOUD SYSTEM

BACKGROUND

Multi-tenant cloud systems allow multiple clients (i.e., users) to share communication and computational resources, such as compute nodes and network switching equipment. Through the shared computational resources, a cloud system is operable to provide computational services on-demand to clients. In many instances the cloud system comprises distributed computational resources, which may be located across multiple data centers in different locations.

Sharing of computational resources in the cloud system enables a provider to use these resources efficiently, while striving to provide adequate performance, which may be specified in service level agreements, to its clients. However, isolation in a cloud system can be difficult. For example, some clients may require that their data be isolated from data of other clients. An isolation failure in a shared resource system is often characterized in terms of its affect on privacy, security, or even performance.

A distinction between cloud systems and conventional data center systems is the need to dynamically reconfigure the system to support newly arriving and departing clients as well as existing client system reconfiguration requests. In many cloud systems, it can be expected that the frequencies of such reconfigurations occur at much higher rates than would be observed in a conventional data center, which may service only a single client or service many clients that typically continually use the data center over long periods of time. The greater occurrence of reconfigurations in a cloud system lends itself to greater occurrences of misconfigurations. For example, instantiating a client system is susceptible to hardware errors in cabling that may inadvertently connect customer domains (contrary to isolation policies).

In cases where a computational resource associated with one customer domain is unintentionally connected to another customer domain, the resource might either be able to communicate on that domain, or be able to listen and receive information from that domain. While sensitive information leakage may be one principal worry of cloud clients, failure to segregate domains can also result in disruption or a decrease in system performance, or increase the risk of a third party attack through a misconfiguration point.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the invention is described by referring mainly to exemplary embodiments. In the following description, numerous specific details are set forth to provide a thorough understanding of the embodiments. However, it will be apparent to one of ordinary skill in the art that the invention may be practiced without limitation to these specific details. In other instances, well known methods and structures have not been described in detail to avoid unnecessarily obscuring the description of the embodiments.

According to an embodiment, a system and a method for isolating tenants in a multi-tenant cloud system are provided. The system and the method for isolating tenants in a multi-tenant cloud system utilize a cloud architecture, which relies on strategic deployment of physical layer network isolation, according to an embodiment. A tenant may be an enterprise customer of a multi-tenant cloud system or any entity that uses the computing resources of the cloud system or contracts to use the computing resources, such as through service level agreements. Computing resources, such as a server or other devices, of the cloud system may be assigned to a tenant.

In an embodiment, a system and a method for isolating tenants in a multi-tenant cloud system provide isolation of tenants under frequent system reconfigurations. In an embodiment, a system and a method for isolating tenants may apply different indicators, such as a color code, based on coarse wavelength division multiplexing (CWDM) or wavelength division multiplexing (WDM) in a multi-tenant cloud system. CWDM uses a small number of wavelengths (e.g., 4-8) to create separate communication channels. CWDM multiplexes multiple independent communication channels on a single optical fiber using passive optical devices. In fiber-optic communications, WDM multiplexes multiple optical carrier signals on a single optical fiber by using different wavelengths (colors) of laser light to carry different signals. In an embodiment, CWDM or WDM may be used to segregate domains for a tenant and thus, isolate the tenant. Although the system and the method is described using CWDM, the embodiments are not limited to CWDM and may apply to any type of WDM where one or more frequencies can be assigned to each domain for sending and receiving data. The system and method may reduce the incidence of incorrect physical network configuration, minimize the possibility of inter-domain communication should physical network misconfiguration occur, and facilitate visually-verifiable domain isolation. A domain may be a collection of logically grouped machines.

Figure 1:
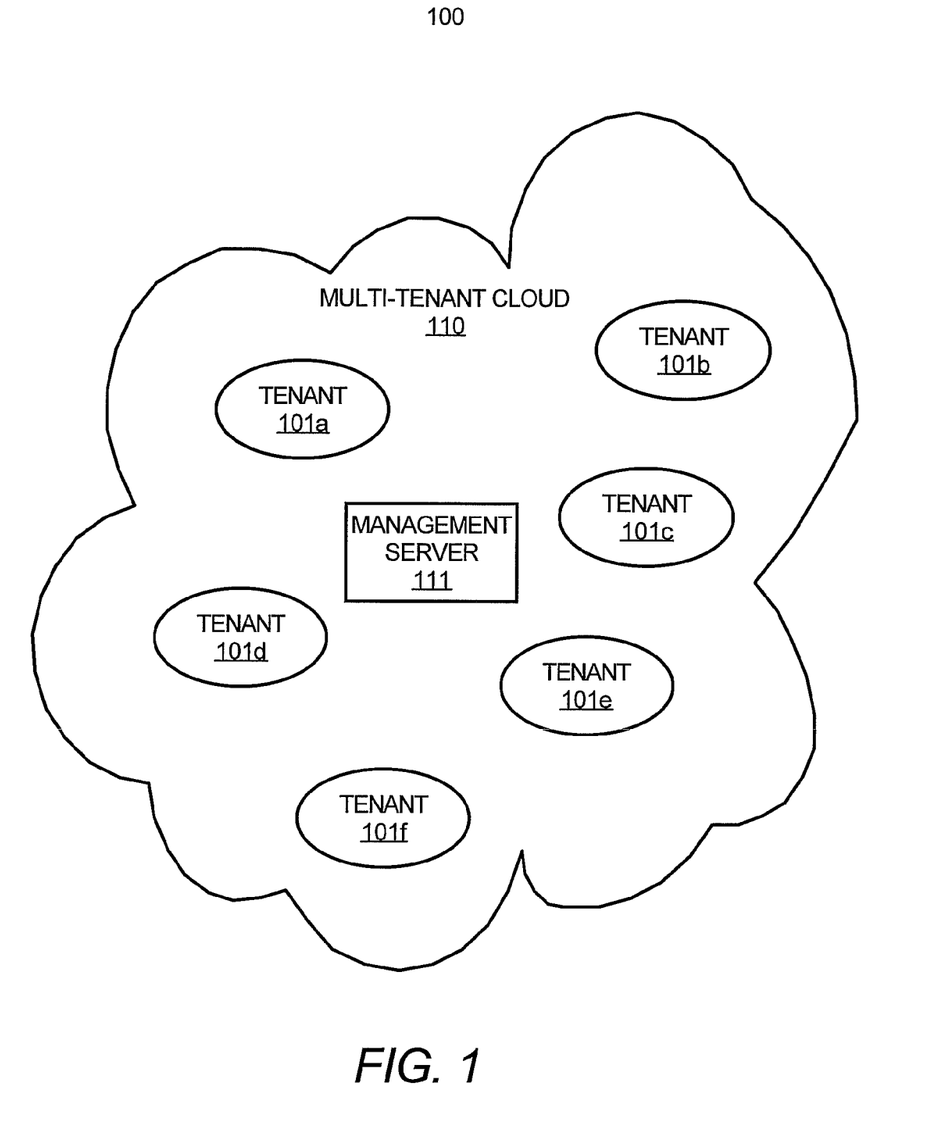
FIG. 1 illustrates a system, according to an embodiment of the invention.

FIG. 1 illustrates a system 100, according to an embodiment of the invention. The system 100 includes a multi-tenant cloud system 110 including a plurality of tenants, such as tenants 101a-f. Each tenant is shown in the multi-tenant cloud system 110 to represent the computational resources of the cloud system 110 applied to each of the tenants 101a-f. The computational resources may include servers, virtual machines, software, switches and other network devices, physical layer network resources, such as cabling and connectors, etc. In addition, the system 100 includes a management server 111. In an embodiment, the management server 111 may manage the multi-tenant cloud system 110. For example, the management server 111 may identify the tenants 101a-f in the multi-tenant cloud system 110 and perform processes for isolating each tenant of the tenants 101a-f.

Figure 2A:
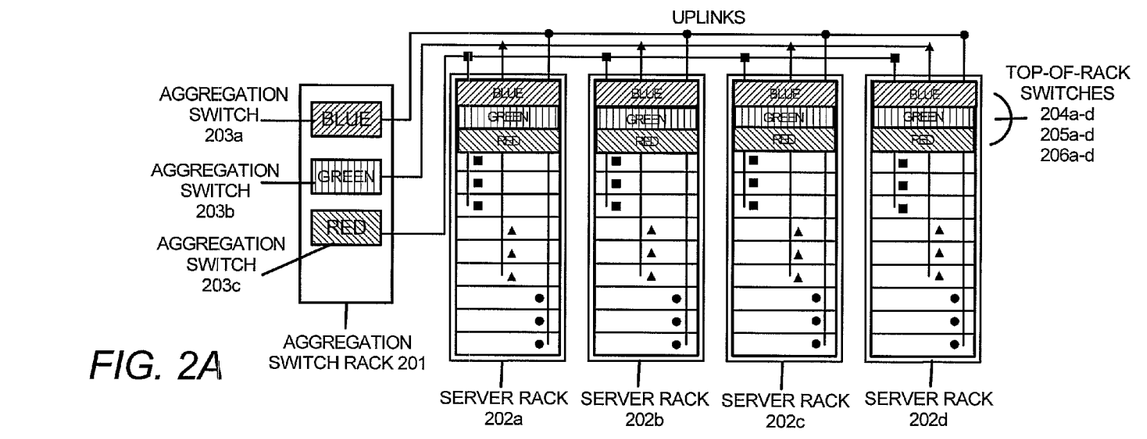
FIGS. 2A and 2B illustrate systems for isolating tenants in a multi-tenant cloud system, according to an embodiment of the invention.
Figure 2B:
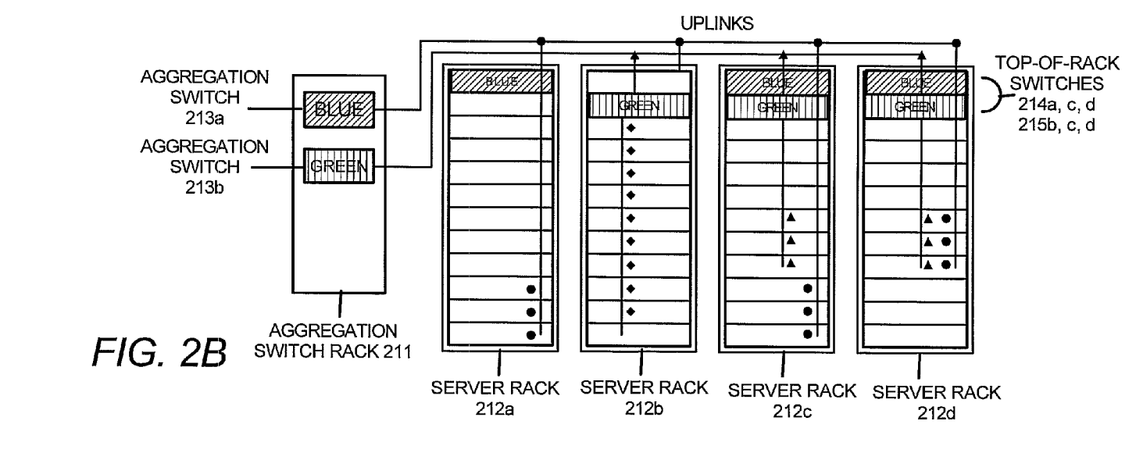

FIGS. 2A and 2B illustrate systems for isolating tenants in a multi-tenant cloud system, according to an embodiment of the invention. It should be understood that the systems depicted in FIGS. 2A and 2B may include additional components and that some of the components described herein may be removed and/or modified without departing from the scope of the invention.

With reference first to FIG. 2A, there is shown an aggregation switch rack 201 including an aggregation switch 203a depicted as blue, an aggregation switch 203b depicted as green, and an aggregation switch 203c depicted as red. An aggregation switch handles interconnection of racks within a domain for multi-rack tenants. An aggregation switch is dedicated to each domain in the row. An aggregation switch is monochromatic. In FIG. 2A, there are also shown server racks 202a, 202b, 202c, and 202d. The server rack 202a includes a top-of-rack switch 204a depicted as blue, a top-of-rack switch 205a depicted as green, and a top-of-rack switch 206a depicted as red. A top-of-rack switch interconnects all servers on server racks and frequently configures the server racks. For domains comprising one or more complete racks, each server on each rack may be connected to a monochromatic top-of-rack switch. In an embodiment, a single top-of-rack switch per rack is needed. The server rack 202b includes a top-of-rack switch 204b depicted as blue, a top-of-rack switch 205b depicted as green, and a top-of-rack switch 206b depicted as red. The server rack 202c includes a top-of-rack switch 204c depicted as blue, a top-of-rack switch 205c depicted as green, and a top-of-rack switch 206c depicted as red. The server rack 202d includes a top-of-rack switch 204d depicted as blue, a top-of-rack switch 205d depicted as green, and a top-of-rack switch 206d depicted as red. In an embodiment, the top-of-rack switches 204a-d, 205a-d, and 206a-d are Ethernet switches.

The top-of-rack switches 204a-d, 205a-d, and 206a-d are configured to communicate with the servers in the server racks 202a-d. In addition, each of the aggregation switches 203a-c is configured to communicate with the top-of-rack switches 204a-d, 205a-d, and 206a-d, respectively. Each of the aggregation switches 203a-c is configured to control each of the different domains in each of the plurality of inter-racks for isolating the plurality of tenants based on the indicator (e.g. color code) so that any aggregation switches and any top-of-rack switches having the same indicator may be connected to a tenant associated with the same indicator. It should be understood that the color code depicted in FIG. 2A is an example of an indicator and the indicator may be represented by any other way, such as the color code, a colored light, text code or a word mark, numeric code or alphanumeric code, or a digital indicator.

In an embodiment, each of the server racks 202a-d is grouped together and makes a plurality of inter-racks in a row. Different portions of the plurality of inter-racks are assigned to different domains. For example, the inter-racks having square dots in the server racks 202a-d indicate that these inter-racks belong to the same domain, which is a collection of logically grouped machines or servers. Likewise, the inter-racks having triangle dots belong to the same domain that is a different domain from the domain of the square dots. Inter-racks having circle dots in the server racks 202a-d belong to another domain. In addition to the top-of-rack switches 204a-d, 205a-d, and 206a-d, the server racks 202a-d include one or more servers that are connected to the corresponding switches in each server rack. In FIG. 2A, the domains include the entire server racks 202a-d.

In an embodiment, the aggregation switches 203a, 203b, and 203c are connected to the top-of-rack switches 204a-d, 205a-d, and 206a-d, respectively, through uplinks, such as a 10 gigabyte Ethernet uplink. In an embodiment, the servers in the server racks 202a-d are configured to communicate with a plurality of tenants of a multi-tenant cloud system and the tenants may share computational resources, such as the servers or storages in the multi-tenant cloud system.

In an embodiment, a server in one of the server racks 202a-d is configured to be connected to an optical transceiver module via a network interface card (NIC). A server in one of the server racks 202a-d may be equipped with a single NIC supporting a single, removable, and hot-pluggable optical transceiver port. Each port may accept an optical transceiver module that may communicate at one wavelength associated with an indicator assigned to its domain. In an embodiment, single transmission rate (e.g., supporting only 1 Gbs) network switches may be exclusively assigned to a domain and may be 'monochrome', configured with interfaces with only a single indicator. In another embodiment, a single type of optical fiber cabling, such as Single Mode Fiber (SMF), may be used throughout the entire cloud interconnect to facilitate reconfigurations. Assignment and reassignment of servers to domains (i.e., server coloring) may be performed by an insertion of the appropriate indicator optical transceiver in each server's modular slots, as necessary.

In one embodiment, different optical transceiver modules are configured to use different wavelengths based on coarse wavelength division multiplexing (CWDM). The different wavelengths do not overlap with each other. Thus, CWDM technology may be used to segregate domains for a tenant. For example, a CWDM transceiver module wavelength set with an exterior case color coding used to distinguish the CWDM transceiver module types at sight may include one of the following colors depending on the wavelength used by the optical transceiver module; 1470 nm—gray, 1490 nm—violet, 1510 nm—blue, 1530 nm—green, 1550 nm—yellow, 1570 nm—orange, 1590 nm—red, and 1610 nm—brown.

In an embodiment, any interface of a wavelength may only communicate with a second interface of the same color. Thus, a misconfiguration, such as connecting a blue server to a red switch, would fail to operate. In an embodiment, switches may be monochrome, thus, all active switch interfaces may only be associated with the same domain. Virtual Local Area Networks (VLANs) may continue to be used within a domain on and across monochromatic switches (i.e., trunked VLANs). However, a misconfiguration of a VLAN on a monochromatic switch is a domain-specific error, and cannot result in a domain breach. In another embodiment, optical transceiver modules include indicators attached to the optical transceiver modules, for example, labeled with color codes. For example, color coded latches are visible when the optical transceiver module is inserted in a NIC port. An indicator may be attached to an optical transceiver module based on the wavelength used by the optical transceiver module after the optical transceiver modules are manufactured. Hence, casual visible inspection may serve to verify that a desired set of servers are associated with the intended domain. In an embodiment, software verification that a server is configured with a transceiver of appropriate indicator may be performed prior to any communications on that interface. If a server detects that an inserted transceiver is not of the intended color, for example, the server may halt any communication on that domain. In an embodiment, a means to verify the correct color interface is to read the transceiver's management interface, where manufacturer's information (e.g., the product and serial number) indicates the wavelength used by the transceiver.

With reference to FIG. 2A, each of the aggregation switches 203a, 203b, and 203c, each of the top-of-rack switches 204a-d, 205a-d, and 206a-d, and each of the different optical transceiver modules includes an indicator associated with one of the different wavelengths. Thus, the plurality of tenants may be isolated based on the shared computational resources the plurality of tenants use and the different domains of servers having different indicator optical transceiver modules.

With reference to FIG. 2B, there is shown an aggregation switch rack 211 including an aggregation switch 213a depicted as blue and an aggregation switch 213b depicted as green. In FIG. 2B, there is also shown a server rack 212a, a server rack 212b, a server rack 212c, and a server rack 212d. The server rack 212a includes a top-of-rack switch 214a depicted as blue. The server rack 212b includes a top-of-rack switch 215b depicted as green. The server rack 212c includes a top-of-rack switch 214c depicted as blue and a top-of-rack switch 215c depicted as green. The server rack 212d includes a top-of-rack switch 214d depicted as blue and a top-of-rack switch 215d depicted as green. The top-of-rack switches 214a, 214c, 214d, 215b, 215c, and 215d may be Ethernet switches. In FIG. 2B, the domains include servers across the server racks 212a-d.

The top-of-rack switches 214a, 214c, 214d, 215b, 215c, and 215d are configured to communicate with the servers in the server racks 212a-d. In addition, each of the aggregation switches 213a, and 213b is configured to communicate with the top-of-rack switches 214a, 214c, 214d, and 215b, 215c, 215d, respectively. Each of the aggregation switches 213a, and 213b is configured to control each of the different domains in each of the plurality of inter-racks for isolating the plurality of tenants based on the indicator (e.g. color code) so that any aggregation switches and any top-of-rack switches having the same indicator may be connected to a tenant associated with the same indicator. In FIG. 2B, the server rack 212a shows a monochromatic rack (blue), the server rack 212b shows a monochromatic rack with intra-rack wire cabling (green), the server rack 212c shows a rack with two configured domains (green/blue), and the server rack 212d shows a rack with two domains on a set of physical servers (green/blue).

Figure 3:
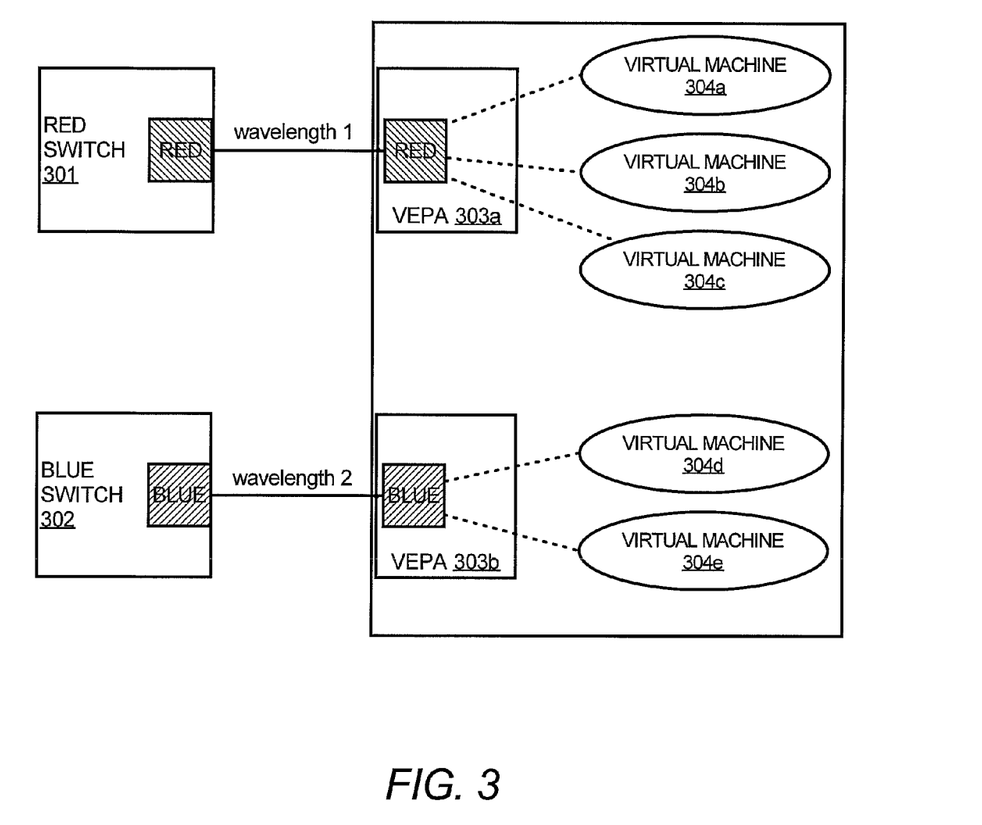
FIG. 3 shows isolating tenants in a multi-tenant cloud system using Virtual Ethernet Port Aggregators, according to an embodiment of the invention.

FIG. 3 shows isolating tenants in a multi-tenant cloud system using Virtual Ethernet Port Aggregators (VEPAs), according to an embodiment of the invention.

With reference to FIG. 3, there is shown a red switch 301, a blue switch 302, a VEPA 303a (red), a VEPA 303b (blue), and a plurality of virtual machines 304a-e. In FIG. 3, domains include VMs across server racks. In an embodiment, the domains may share one of the computational resources through the virtual machines and different tenants are assigned to different virtual machines on the same server. The virtual machines 304a-c are aggregated into a group of the virtual machines and assigned to the VEPA 303a. The virtual machines 304d-e may be aggregated into a group of the virtual machines and assigned to the VEPA 303b. In an embodiment, an interface between a group of the virtual machines and a VEPA may be established to assign the group of the virtual machines to the VEPA 303b. The VEPA 303a is associated with an indicator, red color, and the VEPA 303b is associated with an indicator, blue color. Each indicator is associated with a wavelength based on a CWDM. A domain associated with a switch, such as the red switch 301 or the blue switch 302, may be assigned to one of the VEPAs based on the matching indicator. In addition, the assignment of a switch to a VEPA may be verified based on the matching indicator. A domain may be assigned to a tenant via an optical transceiver module via a single wavelength associated with an indicator corresponding to the single wavelength and to the tenant.

In one embodiment, multiple domains may share a single physical server through the use of virtual machine technology. In such an environment utilization of servers may potentially be very high, and as a consequence this may be one of the prevalent configurations of multi-tenant clouds. In an embodiment, each domain present on a virtualized server may be provided a NIC port equipped with a transceiver module having an appropriate indicator for that domain. While visual verification of domain isolation is not possible due to the potential for an internal, software misconfiguration enabling intra-machine inter domain VM communication, it may be possible to ensure that the correct set of transceiver modules of appropriate indicator is present in a server intended to support the corresponding domains.

In an embodiment, a VEPA system may eliminate the complexity of machine based virtual switches by consolidating all switching functionality, including both frame forwarding and associated frame processing (e.g., Access Control Lists (ACLs)), back into physical switches. A VEPA host module may expose a bridge interface to VMs, where the bridging may be performed in an external switch. By establishing a VEPA interface to a set of virtual machines, all communications between VMs would be directed to and 'reflected off' the local switch port, after invoking any frame operations active on that port (e.g., QoS, filters, etc). In an embodiment, by placing all switching and related functions in the physical switch (as opposed to a machine-hosted virtual switch), domain-wide switch management may be consolidated, and VMs more closely resemble their physical counterparts from the network's perspective. Further, VM portability is more easily supported than in settings where switching functions are distributed across physical and virtual switches.

In an embodiment, each VM in a domain may be associated with one VEPA module network interface, with all outbound traffic from the domain multiplexed and transmitted by the NIC of appropriate color to the attached monochromatic switch. By launching traffic into the switch, VEPA may effectively assign indicator(s) to the traffic of the VMs bound to an interface. Thus, from the perspective of the network, the arriving traffic would appear like any other indicated traffic, though multiplexed and possibly to be forwarded back over the arriving port to support traffic between VMs of the same domain on a physical server. In an embodiment, a virtual machine monitor (VMM) may correctly associate each VM with the correct VEPA interface to the NIC assigned to the domain (i.e., correctly 'coloring' a VM). The correctness of the binding may be subject to software verification by both the VMM and the hosted VM. Further, access control mechanisms on the switch may be configured to block ingress traffic believed to be inadvertently forwarded to a switch port.

An embodiment of a method in which the system 100 may be employed for isolating tenants in a multi-tenant cloud system will now be described with respect to the flow diagrams of the method 400 depicted in FIG. 4. It should be apparent to those of ordinary skill in the art that the method 400, and for other methods described herein that other steps may be added or existing steps may be removed, modified or rearranged without departing from the scope of the invention. Also, the methods are described with respect to the system 100 by way of example and not limitation, and the methods may be used in other systems.

Figure 4:
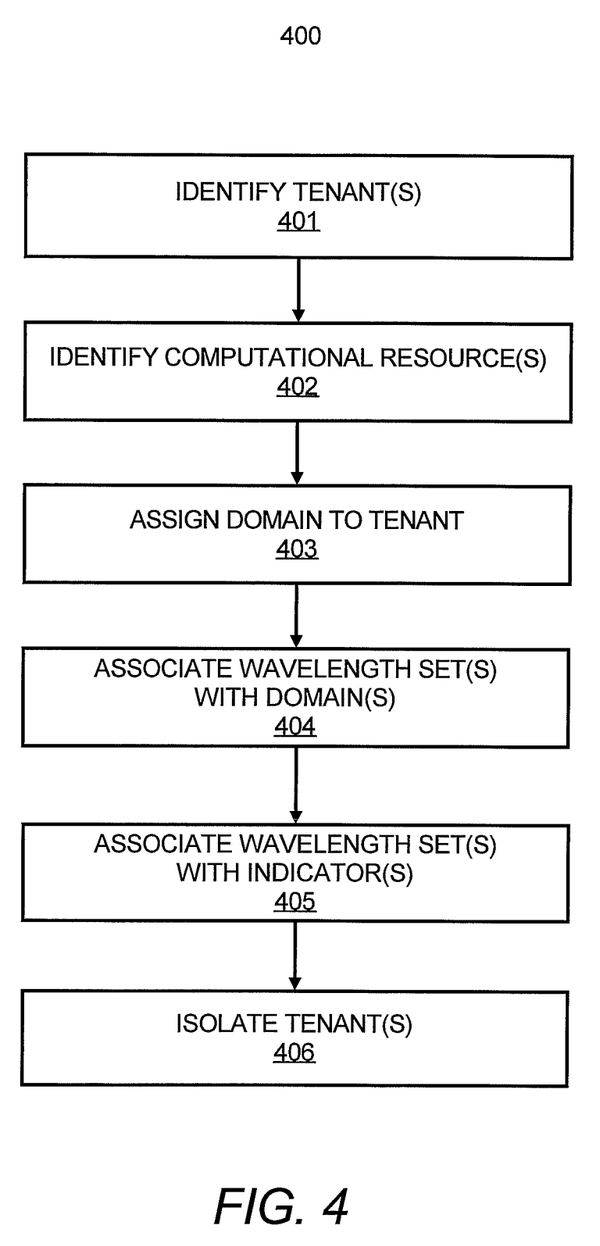
FIG. 4 illustrates a flow chart of a method for isolating tenants in a multi-tenant cloud system, according to an embodiment of the invention.

FIG. 4 illustrates a flowchart of a method 400 for isolating tenants in a multi-tenant cloud system, according to an embodiment of the present invention. One or more of the steps of the method 400 may be performed by a computer system. The computer system may include the management server 111 shown in FIG. 1 or another computer system.

At step 401, a plurality of tenants in the multi-tenant cloud system are identified, for instance, by the management server 111. The plurality of tenants share computational resources in the multi-tenant cloud system. In an embodiment, a tenant that needs to be isolated from the plurality of tenants may be identified based on the shared computational resources.

At step 402, the computational resources for each tenant of the plurality of tenants are identified. For example, the management server 111 stores information regarding computational resources allocated to each identified tenant.

At step 403, a domain to each tenant of the plurality of tenants is assigned. The assigning may be based on a CWDM or other types of WDM. The domain includes the computational resources for each tenant. The WDM uses a plurality of wavelength sets and each set includes one or more wavelengths.

At step 404, for each wavelength set of the plurality of wavelength sets, the wavelength set is associated with a different domain of the plurality of domains.

At step 405, for each wavelength set of the plurality of wavelength sets, the wavelength set is associated with a different indicator. The different indicator identifies the domain for the wavelength set. The management server 111 may store information identifying each domain, the wavelength set assigned to each domain and the indicator assigned to each domain.

At step 406, each tenant of the plurality of tenants is isolated using the associated wavelength sets and the associated indicators. In an embodiment, one or more of the plurality of tenants are prevented from using the computational resources if the domain identified by the indicator is different from the domain assigned to each of the plurality of tenants.

Some or all of the operations set forth in the figures may be contained as a utility, program, or subprogram, in any desired computer readable storage medium and executed by a processor on a computer system. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices.

Exemplary computer readable storage media that may be used to store the software may include Random Access Memory (RAM), Read Only Memory (ROM), Electrically Programmable Read Only Memory (EPROM), Electrically Erasable Programmable Read Only Memory (EEPROM), hard disks, or other data storage devices.

Figure 5:
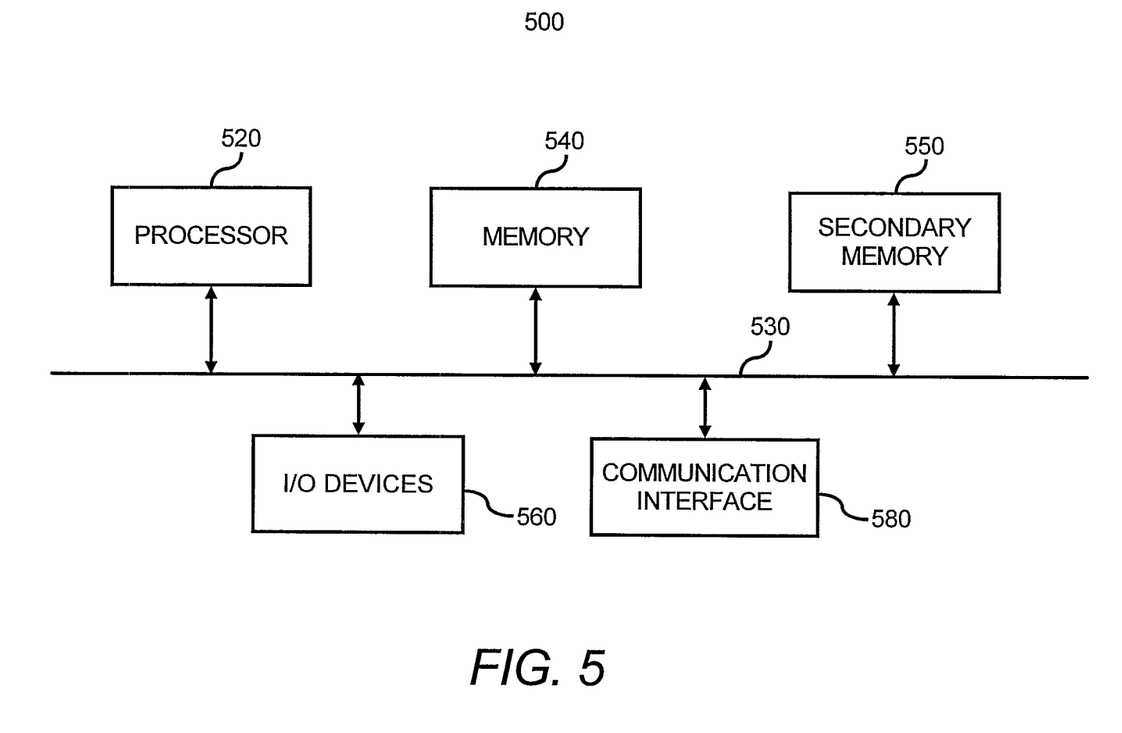
FIG. 5 shows a block diagram of a computer system configured to implement or execute one or more of the processes depicted in FIG. 4, according to an embodiment of the invention.

FIG. 5 illustrates a block diagram of a computing apparatus 500 configured to implement or execute one or more of the processes depicted in FIG. 4, according to an embodiment. In this respect, the computing apparatus 500 may be used as a platform for executing one or more of the functions described hereinabove with respect to the management server 111. It should be understood that the illustration of the computing apparatus 500 is a generalized illustration and that the computing apparatus 500 may include additional components and that some of the components described may be removed and/or modified without departing from the scope of the invention.

The computing apparatus 500 includes a processor 520 that may implement or execute some or all of the steps described in one or more of the processes depicted in FIG. 4. The computing apparatus 500 also includes a main memory 540, such as a Random Access Memory (RAM), where software may reside during runtime, and a secondary memory 550. The secondary memory 550 may include, for example, a nonvolatile memory or other type of non-volatile data storage where a copy of the program code for one or more of the processes depicted in FIG. 4 may be stored. For example, the processor 520 is configured to implement one or more programs stored in the memory 540 to identify a plurality of tenants in the multi-tenant cloud system, to identify the computational resources for each of the plurality of tenants, to assign a domain to each of the plurality of tenants based on a CWDM, and to isolate each of the plurality of tenants based on the computational resources and the domain used by each of the plurality of tenants. Commands and data from the processor 520 are communicated over a communication bus 530.

The computer system 500 includes I/O devices 560. The I/O devices 560 may include a display and/or user interfaces comprising one or more I/O devices, such as a keyboard, a mouse, a stylus, speaker, and the like. A communication interface 580 is provided for communicating with other components. The communication interface 580 may be a wireless interface. The communication interface 580 may be a network interface.

Although described specifically throughout the entirety of the instant disclosure, representative embodiments of the invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. A method for isolating tenants in a multi-tenant cloud system, the method comprising:

identifying, using a computer system, a plurality of tenants in the multi-tenant cloud system, wherein the plurality of tenants share computational resources in the multi-tenant cloud system;

providing a plurality of racks including servers, wherein the servers provide the computational resources for the plurality of tenants;

assigning, by the computer system, different portions of the servers in the plurality of racks to different domains;

assigning, by the computer system, each of the different domains to a respective tenant of the plurality of tenants based on a wavelength division multiplexing (WDM), wherein the WDM uses a plurality of wavelength sets, each wavelength set including one or more wavelengths;

associating, by the computer system, each of the plurality of wavelength sets with a different domain of the plurality of domains and with a different visual indicator identifying the domain for the wavelength set, wherein each of the plurality of visual indicators is physically attached to a respective one of the servers or slot housing the server to identify the domain to which the server is allocated; and controlling, by aggregation switches, each of the servers assigned to the different domains for isolating the plurality of tenants.

2. The method of claim 1, comprising for each domain,
applying the visual indicator associated with the domain to the servers; and
using the wavelength set for the domain with the servers.

3. The method of claim 1, wherein each of the servers of each domain comprises an optical transceiver module for sending and receiving data.

4. The method of claim 1, further comprising:
verifying assignment of the domain to each tenant based on the visual indicators attached to the servers.

5. The method of claim 1, further comprising:
preventing one of the tenants from using one of the servers if the domain identified by the visual indicator attached to the server is different from the domain assigned to the tenant.

6. The method of claim 1, wherein each of the plurality of visual indicators is to display a color or text to identify the respective one of the plurality of domains.

7. A method for isolating tenants in a multi-tenant cloud system, the method comprising:
identifying, using a computer system, a plurality of tenants, wherein the plurality of tenants share computational resources and include virtual machines across the computational resources;
providing a plurality of racks including servers, wherein the servers provide the computational resources for the tenants;
assigning, by the computer system, different portions of the servers in the plurality of racks to different domains;
assigning, by the computer system, each of the different domains to a respective tenant of the plurality of tenants via a network device based on wavelength division multiplexing (WDM), wherein the WDM uses a plurality of wavelength sets, each wavelength set including one or more wavelengths, and wherein the network device communicates at a single wavelength set;
associating, by the computer system, the single wavelength set with an assigned domain of each tenant, and with a visual indicator identifying the domain for the single wavelength set, wherein each of the plurality of visual indicators is physically attached to a respective one of the servers or slot housing the server to identify the domain to which the server is allocated; and
controlling, by aggregation switches, each of the servers assigned to the different domains for isolating the plurality of tenants.

8. The method of claim 7, wherein each network device comprises an optical transceiver module to use the associated wavelength set for the domain for sending and receiving data.

9. The method of claim 7, wherein the domains share one of the computational resources through the virtual machines.

10. The method of claim 9, further comprising:
aggregating one or more of the virtual machines into one or more groups of the virtual machines;
assigning each group of the one or more groups of the virtual machines to different Virtual Ethernet Port Aggregators (VEPAs), wherein the different VEPAs is associated with the visual indicator identifying the domain for the single wavelength set; and
assigning one of the domains to one of the VEPAs.

11. The method of claim 10, wherein assigning each group of the one or more groups of the virtual machines to different VEPAs further comprises:
establishing an interface between each group of the one or more groups of the virtual machines and the assigned VEPA.

12. The method of claim 10, further comprising:
verifying assignment of one of the domains to one of the VEPAs based on the visual indicator attached to one of the servers.

13. The method of claim 10, further comprising:
preventing one or more of the virtual machines from using one of the servers if the domain identified by the visual indicator attached to the server is different from the domain assigned to the VEPA.

14. The method of claim 12, further comprising:
associating a virtual machine monitor with the virtual machines, wherein the virtual machine monitor verifies the interface between the group of the virtual machines and the VEPA.

15. The method of claim 7, wherein each of the plurality of visual indicators is to display a color or text to identify the respective one of the plurality of domains.

16. A system for isolating tenants in a multi-tenant cloud system, the system comprising:
servers to provide computational resources for a plurality of tenants;
a plurality of racks including the servers, wherein different portions of the servers in the plurality of racks are assigned to different domains, wherein each of the different domains is assigned to a respective one of the plurality of tenants and is associated with one of a plurality of wavelength sets for optical communications, each of the plurality of wavelength sets including one or more wavelengths;
Ethernet switches to communicate with the servers in the plurality of racks;
aggregation switches to communicate with the Ethernet switches to control each of the servers assigned to the different domains for isolating the plurality of tenants; and
visual indicators attached to the servers or slots housing the servers to identify the different domains to which the servers are assigned, wherein each of the visual indicators is associated with a respective one of the different domains.

17. The system of claim 16, wherein each of the servers in the plurality of racks is to be connected to a different optical transceiver module, and the different optical transceiver modules are to use different wavelengths based on coarse wavelength division multiplexing (CWDM).

18. The system of claim 17, wherein each aggregation switch, each Ethernet switch, and each optical transceiver module includes a visual indicator identifying the different domains.

19. The system of claim 16, wherein the visual indicators attached to the servers display different colors to identify the different domains to which the servers are assigned.

* * * * *